(12) United States Patent
Ito

(10) Patent No.: US 12,528,110 B2
(45) Date of Patent: Jan. 20, 2026

(54) STEEL COMPONENT AND PRODUCTION METHOD FOR THE SAME

(71) Applicant: NIPPON STEEL CORPORATION, Tokyo (JP)

(72) Inventor: Yasuhiro Ito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 642 days.

(21) Appl. No.: 17/802,601

(22) PCT Filed: Mar. 16, 2021

(86) PCT No.: PCT/JP2021/010486
§ 371 (c)(1),
(2) Date: Aug. 26, 2022

(87) PCT Pub. No.: WO2021/187450
PCT Pub. Date: Sep. 23, 2021

(65) Prior Publication Data
US 2023/0138581 A1 May 4, 2023

(30) Foreign Application Priority Data
Mar. 16, 2020 (JP) .................................. 2020-045649

(51) Int. Cl.
*B21D 22/02* (2006.01)
*B21D 5/08* (2006.01)
(Continued)

(52) U.S. Cl.
CPC ......... *B21D 22/022* (2013.01); *B21D 39/031* (2013.01); *B32B 3/04* (2013.01);
(Continued)

(58) Field of Classification Search
CPC .... B21D 22/022; B21D 22/21; B21D 35/007; B21D 39/031; B21D 53/88;
(Continued)

(56) References Cited

U.S. PATENT DOCUMENTS

2014/0147693 A1   5/2014   Yasuyama et al.
2018/0195144 A1*  7/2018   Morino .............. B21D 22/022
(Continued)

FOREIGN PATENT DOCUMENTS

JP     5488703 B2    5/2014
JP     5741648 B2    7/2015
(Continued)

*Primary Examiner* — Jenny R Wu
(74) *Attorney, Agent, or Firm* — Birch, Stewart, Kolasch & Birch, LLP

(57) ABSTRACT

A production method for a steel component includes preparing a patchwork material including steel sheets that are laid one on another, at least one of overlap surfaces of the steel sheets including a zinc-based plating layer, heating the patchwork material, and performing hot stamping on the patchwork material heated to form the steel component in which a joint part between the steel sheets is disposed in a bent area. When $t_{out}$ denotes a sheet thickness of a steel sheet located on an outer side in the bent area, and $t_{in}$ denotes a sheet thickness of a steel sheet located on an inner side, $t_{out}/t_{in} \geq 1.1$ is satisfied. The joint part is disposed in a ridge portion or at a position in a vicinity of the ridge portion, and the position satisfies $d/t_{in} < 8.2$, where d denotes a distance from the ridge portion to the joint part.

4 Claims, 13 Drawing Sheets

(51) Int. Cl.
*B21D 21/00* (2006.01)
*B21D 35/00* (2006.01)
*B21D 39/03* (2006.01)
*B23K 31/02* (2006.01)
*B32B 3/04* (2006.01)
*B32B 3/08* (2006.01)
*B32B 3/28* (2006.01)
*B32B 7/08* (2019.01)
*B32B 15/01* (2006.01)
*C21D 9/46* (2006.01)
*C23C 2/06* (2006.01)
*C23C 2/20* (2006.01)
*B23K 101/00* (2006.01)

(52) U.S. Cl.
CPC ............... *B32B 3/085* (2013.01); *B32B 3/28* (2013.01); *B32B 7/08* (2013.01); *B32B 15/011* (2013.01); *B32B 15/013* (2013.01); *C21D 9/46* (2013.01); *C23C 2/06* (2013.01); *C23C 2/20* (2013.01); *B23K 2101/006* (2018.08); *B32B 2250/02* (2013.01); *B32B 2307/732* (2013.01); *B32B 2605/08* (2013.01); *C21D 2211/008* (2013.01)

(58) Field of Classification Search
CPC ............ B23K 2101/006; B32B 15/011; B32B 15/013; B32B 2250/02; B32B 2307/732; B32B 2605/08; B32B 3/04; B32B 3/085; B32B 3/28; B32B 7/08; C21D 2211/008; C21D 9/46; C23C 2/06; C23C 2/20
See application file for complete search history.

(56) References Cited

U.S. PATENT DOCUMENTS

| | | |
|---|---|---|
| 2021/0197525 A1 | 7/2021 | Fujita et al. |
| 2021/0276126 A1 | 9/2021 | Chen et al. |
| 2023/0294205 A1* | 9/2023 | Chen ........................ B23K 9/02 219/121.64 |

FOREIGN PATENT DOCUMENTS

| | | | |
|---|---|---|---|
| JP | 2016-112569 A | 6/2016 | |
| JP | 6125992 B2 | 5/2017 | |
| WO | WO 2019/194308 A1 | 10/2019 | |
| WO | WO-2020003900 A1 * | 1/2020 | ............. B21D 22/00 |

* cited by examiner

STEEL COMPONENT AND PRODUCTION METHOD FOR THE SAME

TECHNICAL FIELD

The present disclosure relates to a steel component including a bent area and a production method for the steel component.

BACKGROUND ART

In recent years, in the automotive industry, there are demands for a weight reduction of a vehicle body for the purpose of improvement in fuel efficiency and enhancement in collision safety of a vehicle body. To meet these demands, wall-thinning by applying a high-strength steel sheet, optimization of sheet thicknesses by applying tailored blanks, and the like have been studied for various components constituting an automobile body. A tailored blank is, for example, a patchwork material that has a partly increased thickness by joining a plurality of stacked steel sheets together. By subjecting such a patchwork material to hot stamping (hot press working), a steel component in which a specific portion is made to have high strength can be formed.

For example, Patent Literatures 1 to 3 disclose making of a patchwork material by laying a flat-shaped reinforcing member on a blank and welding them together at given spots. In these Patent Literatures, the patchwork material is formed into a steel component having a substantially hat-shaped cross section.

CITATION LIST

Patent Literature

Patent Literature 1: Japanese Patent No. 5488703
Patent Literature 2: Japanese Patent No. 5741648
Patent Literature 3: Japanese Patent No. 6125992

SUMMARY OF INVENTION

Technical Problem

In making a patchwork material, for example, a steel sheet including a zinc-based plating layer such as a galvanized steel sheet and a galvannealed steel sheet can be used. However, when a patchwork material including a steel sheet including a zinc-based plating layer is subjected to hot stamping and given a bend, liquid metal embrittlement (LME) can occur on an overlap surface between steel sheets. LME is a phenomenon in which molten zinc enters into crystal grain boundaries of a base metal of a steel sheet included in a patchwork material, and due to tension applied to the steel sheet in this state, cracks develop on the surface of the steel sheet. In other words, LME is caused to occur by presence of liquid zinc and tension produced in working.

An objective of the present disclosure is to prevent liquid metal embrittlement from occurring when a steel component is produced from a patchwork material by hot stamping.

Solution to Problem

A production method according to the present disclosure is a production method for a steel component that includes a bent area. The production method includes: a step of preparing a patchwork material including a first steel sheet and a second steel sheet that are laid one on another, at least one of an overlap surface of the first steel sheet to the second steel sheet and an overlap surface of the second steel sheet to the first steel sheet including a zinc-based plating layer; a step of heating the patchwork material; and a step of performing hot stamping using press tooling on the patchwork material heated in the step of heating to form the steel component in which a joint part between the first steel sheet and the second steel sheet is disposed in the bent area. When $t_{out}$ denotes a sheet thickness of a steel sheet located on an outer side in the bent area out of the first steel sheet and the second steel sheet, and $t_{in}$ denotes a sheet thickness of a steel sheet located on an inner side in the bent area out of the first steel sheet and the second steel sheet, $t_{out}/t_{in} \geq 1.1$ is satisfied. The joint part is disposed in a ridge portion in the bent area or at a position in a vicinity of the ridge portion, the position satisfying $d/t_{in} < 8.2$, where d denotes a distance from the ridge portion to the joint part when the steel component is viewed in a cross section.

Advantageous Effect of Invention

According to the present disclosure, when a steel component is produced from a patchwork material by hot stamping, liquid metal embrittlement can be prevented from occurring.

DESCRIPTION OF EMBODIMENTS

Figure 1:
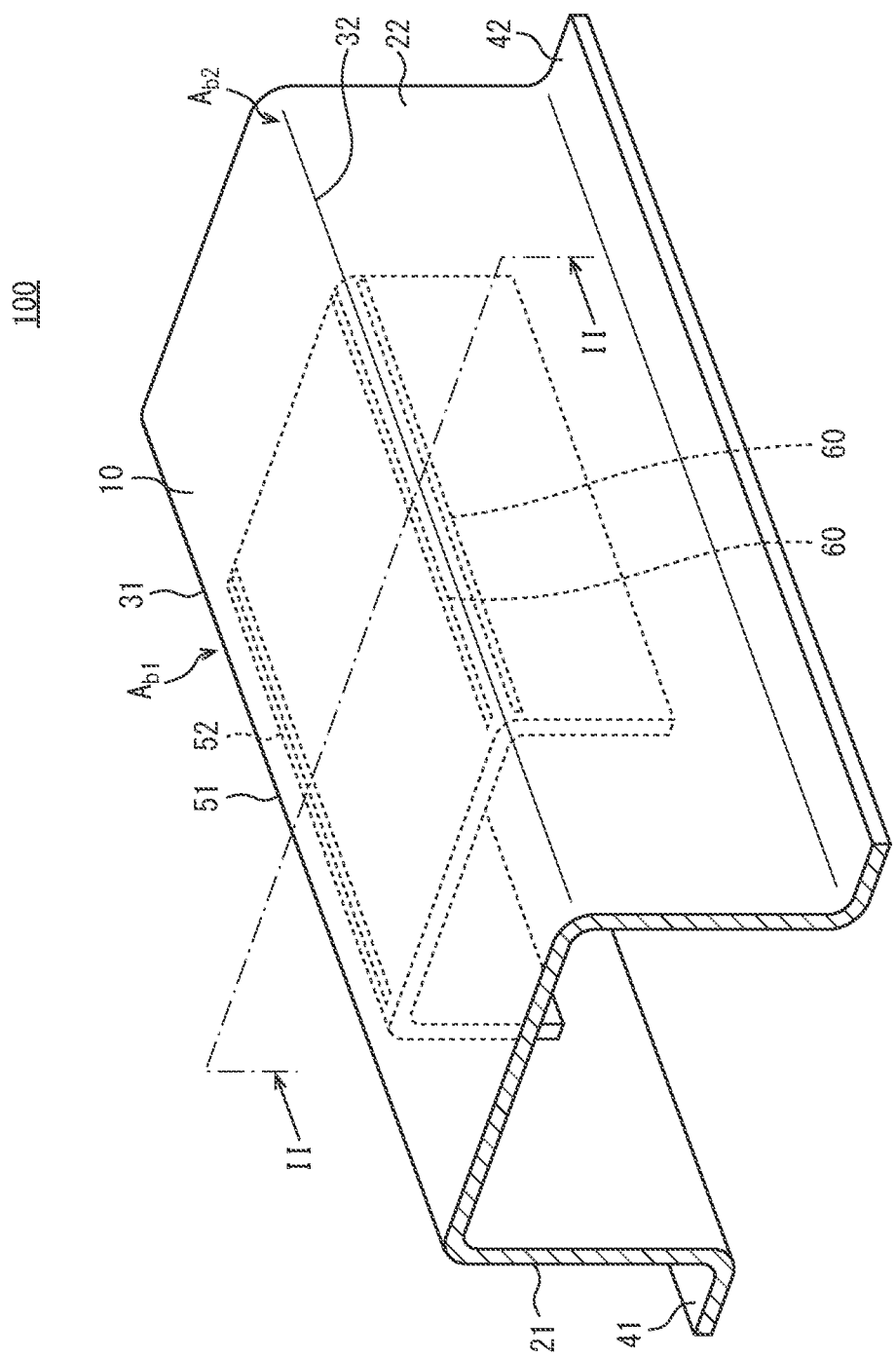
FIG. 1 is a perspective view illustrating a part of a steel component according to a first embodiment.

A production method according to an embodiment is a production method for a steel component that includes a bent area. The production method includes: a step of preparing a patchwork material including a first steel sheet and a second steel sheet that are laid one on another, at least one of an overlap surface of the first steel sheet to the second steel sheet and an overlap surface of the second steel sheet to the first steel sheet including a zinc-based plating layer; a step of heating the patchwork material; and a step of performing hot stamping using press tooling on the patchwork material heated in the step of heating to form the steel component in which a joint part between the first steel sheet and the second steel sheet is disposed in the bent area. When $t_{out}$ denotes a sheet thickness of a steel sheet located on an outer side in the bent area out of the first steel sheet and the second steel sheet, and $t_{in}$ denotes a sheet thickness of a steel sheet located on an inner side in the bent area out of the first steel sheet and the second steel sheet, $t_{out}/t_{in} \geq 1.1$ is satisfied. The joint part is disposed in a ridge portion in the bent area or at a position in a vicinity of the ridge portion, the position satisfying $d/t_{in} < 8.2$, where d denotes a distance from the ridge portion to the joint part when the steel component is viewed in a cross section (first configuration).

When a bend is given to a plurality of steel sheets that are laid one on the other, if the steel sheets are not integrated together in a bent area, a neutral axis is present substantially at a center of a sheet thickness of each steel sheet. In contrast, in the production method according to the first configuration, the joint part between the first steel sheet and the second steel sheet is disposed in the bent area of the steel component. In other words, the first steel sheet and the second steel sheet are integrated together in the bent area of the steel component. In this case, in the steel component, a neutral axis provided when the bent area is formed is positioned substantially at a center of a sheet thickness of the first steel sheet and the second steel sheet in a state where they are laid one on the other, rather than substantially at a center of each of the first steel sheet and the second steel sheet.

At the same time, out of the first steel sheet and the second steel sheet, a sheet thickness $t_{in}$ of a steel sheet located on an inner side in the bent area is smaller than a sheet thickness $t_{out}$ of a steel sheet located on an outer side in the bent area. More specifically, the sheet thicknesses $t_{in}$ and $t_{out}$ satisfy $t_{out}/t_{in} \geq 1.1$. As a result, the overlap surfaces of the first steel sheet and the second steel sheet can be positioned inner than (on a compression side of) the neutral axis in the bent area. In other words, when a steel component is produced from a patchwork material by hot stamping (hot press working), a boundary between the first steel sheet and the second steel sheet can be disposed at a location where tensile stress that is one of causes of liquid metal embrittlement (LME) substantially does not act. Consequently, even when at least one of the first steel sheet and the second steel sheet includes the zinc-based plating layer and thereby liquid zinc is present in the overlap surfaces of the steel sheets in the hot stamping, it can be prevented LME from occurring in the overlap surfaces of the steel sheets.

Further, according to the first configuration, the joint part between the first steel sheet and the second steel sheet is disposed in the ridge portion or in a vicinity of the ridge portion in the bent area of the steel component. When the joint part is disposed in a vicinity of the ridge portion, $d/t_{in} < 8.2$ is satisfied, where d denotes a distance from the ridge portion to the joint part when the steel component is viewed in a cross section. This enables enhancement in an effect of integrating the first steel sheet and the second steel sheet together particularly in the ridge portion, and the neutral axis provided when the patchwork material is bent is likely to be disposed substantially at a center of the sheet thickness of the first steel sheet and the second steel sheet in a state where they are laid one on the other. As a result, the overlap surfaces of the first steel sheet and the second steel sheet is likely to be positioned inner than (on the compression side of) the neutral axis, and thus LME can be prevented from occurring on the overlap surfaces of the steel sheets.

In the production method, in the step of heating, the patchwork material may be heated to a temperature that is more than or equal to a melting start temperature of the zinc-based plating layer (second configuration).

In the patchwork material before being heated in the step of heating, a melting start temperature of the zinc-based plating layer is, for example, 700° C. or less (third configuration).

In the production method, $t_{out}/t_{in} \geq 1.2$ is preferably satisfied (fourth configuration).

When the patchwork material is bent, the neutral axis may move inward in accordance with the sheet thickness of the patchwork material and a bending radius. For that reason, in the fourth configuration, out of the first steel sheet and the second steel sheet included in the patchwork material, the sheet thickness $t_{out}$ of the steel sheet located on the outer side in the bent area that is 1.2 times or more the sheet thickness $t_{in}$ of the steel sheet located on the inner side in the bent area is kept. As a result, disposing the overlap surfaces between the first steel sheet and the second steel sheet inner than (on the compression side of) the neutral axis becomes easier. Consequently, the occurrence of LME in the overlap surfaces between the first steel sheet and the second steel sheet can be further prevented.

In the production method, the joint part between the first steel sheet and the second steel sheet is preferably disposed in the ridge portion in the bent area or at a position in a vicinity of the ridge portion, the position satisfying $d/t_{in} < 2.3$ (fifth configuration).

According to the fifth configuration, the joint part between the first steel sheet and the second steel sheet is disposed in the ridge portion in the bent area of the steel component. Alternatively, the joint part is disposed at a position in a vicinity of the ridge portion, the position satisfying $d/t_{in} < 2.3$. This enables the effect of integrating the first steel sheet and the second steel sheet together in the ridge portion to be further enhanced.

The first steel sheet and the second steel sheet are preferably subjected to continuous joining (sixth configuration).

According to the sixth configuration, the first steel sheet and the second steel sheet are subjected to the continuous joining. This enables the effect of integrating the first steel sheet and the second steel sheet together to be enhanced in the bent area of the steel component.

The overlap surface of the first steel sheet to the second steel sheet and the overlap surface of the second steel sheet to the first steel sheet may each have a zinc-based plating layer (seventh configuration).

According to the seventh configuration, both the first steel sheet and the second steel sheet included in the patchwork material have zinc-based plating layers on their overlap surfaces facing opposing steel sheets. In this case, an amount of zinc in the boundary between the first steel sheet and the second steel sheet becomes large, and it is considered that LME is likely to occur on the overlap surfaces between the first steel sheet and the second steel sheet when the hot stamping is performed on the patchwork material. However, as described above, the first steel sheet and the second steel sheet are integrated together in the bent area of the steel component, and additionally, the sheet thickness $t_{in}$ of the steel sheet located on the inner side in the bend is smaller than the sheet thickness $t_{out}$ of the steel sheet located on the outer side in the bend. As a result, in the bent area, the overlap surfaces between the first steel sheet and the second steel sheet can be positioned inner than (on the compression side of) the neutral axis. Therefore, as in the seventh configuration, even in a case where each of the first steel sheet and the second steel sheet includes a zinc-based plating layer on its overlap surface to an opposing steel sheet, the occurrence of LME on the overlap surfaces between the steel sheets can be prevented.

In a case where each of steel sheets included in a patchwork material includes a plating layer as in the seventh configuration, oxide scales can be prevented from being produced when the patchwork material is subjected to the hot stamping. As a result, there is no need to perform processing for removing oxide scales such as shotblasting on a steel component formed from the patchwork material. Consequently, a production process for the steel component can be simplified.

A steel component according to an embodiment is formed of a patchwork material including a first steel sheet and a second steel sheet that are laid one on another. The steel component includes a bent area and a joint part. The joint part is disposed in the bent area and joins the first steel sheet and the second steel sheet together. In the formed steel component, the first steel sheet and the second steel sheet each include a martensite phase. At least one of an overlap surface of the first steel sheet to the second steel sheet and an overlap surface of the second steel sheet to the first steel sheet has a zinc-based plating layer. When $t_{out}$ denotes a sheet thickness of a steel sheet located on an outer side in the bent area out of the first steel sheet and the second steel sheet, and $t_{in}$ denotes a sheet thickness of a steel sheet located on an inner side in the bent area out of the first steel sheet and the second steel sheet, $t_{out}/t_{in} \geq 1.1$ is satisfied. The joint part is disposed in a ridge portion in the bent area or at a position in a vicinity of the ridge portion, the position satisfying $d/t_{in} < 8.2$, where d denotes a distance from the ridge portion to the joint part when the steel component is viewed in a cross section (eighth configuration).

In the steel component, a melting start temperature of the zinc-based plating layer may be 790° C. or less (ninth configuration).

Embodiments of the present disclosure will be described below with reference to the drawings. In the drawings, the same or equivalent components will be denoted by the same reference numerals, and description of the parts will not be repeated.

First Embodiment

[Configuration of Steel Component]

Figure 2:
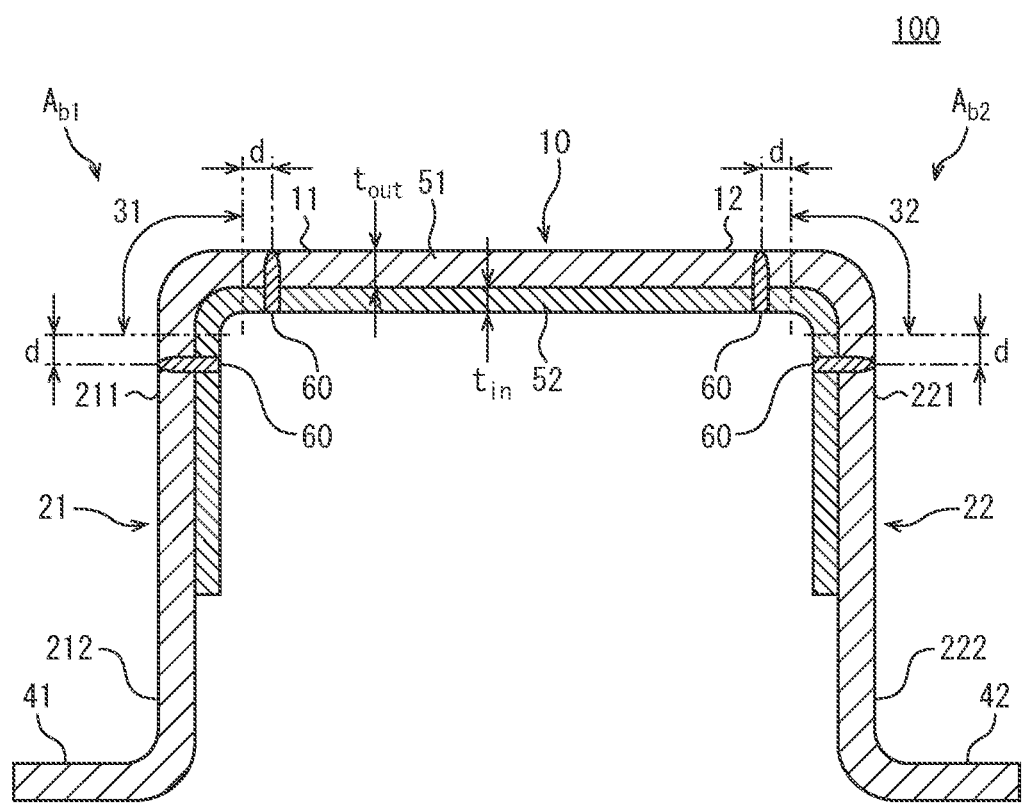
FIG. 2 is a II-II cross-sectional view of FIG. 1.

FIG. 1 is a perspective view illustrating a part of a steel component 100 according to a first embodiment. FIG. 2 is a cross-sectional view (II-II sectional view) of the steel component 100 illustrated in FIG. 1. A cross section of the steel component 100 refers to a section obtained by cutting the steel component 100 along a plane perpendicular to its longitudinal direction. The steel component 100 is a steel-made component including bent areas $A_{b1}$ and $A_{b2}$, typically a structural component to be used in an automobile body. Examples of the steel component 100 include A-pillar reinforcement, B-pillar reinforcement, bumper reinforcement, tunnel reinforcement, side sill reinforcement, roof reinforcement, and floor cross member. The steel component 100 is produced by hot stamping (hot press working).

Referring to FIG. 1, the steel component 100 has a cross section that is substantially hat-shaped. Specifically, the steel component 100 includes a top 10, side walls 21 and 22, ridge portions 31 and 32, and flanges 41 and 42. The top 10, the side walls 21 and 22, the ridge portions 31 and 32, and the flanges 41 and 42 extend in a longitudinal direction of the steel component 100. Hereinafter, the longitudinal direction of the steel component 100 will be referred to simply as a longitudinal direction for convenience of description, and an up-down direction in the paper of FIG. 1 will be referred to simply as an up-down direction. In addition, a direction that is perpendicular to the longitudinal direction and the up-down direction will be referred to as a width direction.

Referring to FIG. 2, at one side edge of the top 10, the side wall 21 is disposed via the ridge portion 31. The ridge portion 31 is a bent portion (corner portion) that is formed between the top 10 and the side wall 21 in the steel component 100 and is an area between R-ends on an inner side in the bend. When viewed in a cross section of the steel component 100, the ridge portion 31 substantially forms an arc shape.

The ridge portion 31 is included in the bent area $A_{b1}$ of the steel component 100. In addition to the ridge portion 31, the bent area $A_{b1}$ includes an edge portion 11 of the top 10 on the ridge portion 31 side and an edge portion (upper edge portion) 211 of the side wall 21 on the ridge portion 31 side. The one edge portion 11 of the top 10 and the upper edge portion 211 of the side wall 21 are disposed on opposite sides of the ridge portion 31 and form the bent area $A_{b1}$ together with the ridge portion 31. On the side wall 21, at an edge portion (lower edge portion) 212 on an opposite side to the ridge portion 31, the flange 41 is disposed. The flange 41 protrudes from the lower edge portion 212 of the side wall 21 outward in the width direction.

On the other side edge of the top 10, the side wall 22 is disposed via the ridge portion 32. The ridge portion 32 is a bent portion (corner portion) that is formed between the top 10 and the side wall 22 in the steel component 100 and is an area between R-ends on an inner side in the bend. When viewed in a cross section of the steel component 100, the ridge portion 32 substantially forms an arc shape.

The ridge portion 32 is included in the bent area $A_{b2}$ of the steel component 100. In addition to the ridge portion 32, the bent area $A_{b2}$ includes an edge portion 12 of the top 10 on the ridge portion 32 side and an edge portion (upper edge portion) 221 of the side wall 22 on the ridge portion 32 side. The other edge portion 12 of the top 10 and the upper edge portion 221 of the side wall 22 are disposed on opposite sides of the ridge portion 32 and form the bent area $A_{b2}$ together with the ridge portion 32. On the side wall 22, at an edge portion (lower edge portion) 222 on an opposite side to the ridge portion 32, the flange 42 is disposed. The flange 42 protrudes from the lower edge portion 222 of the side wall 22 outward in the width direction.

The steel component 100 is formed of a patchwork material including steel sheets 51 and 52. The patchwork material is a starting material for pressing and includes a steel sheet as a main starting material and a steel sheet as a reinforcing member. In the patchwork material, the main starting material covers the entire reinforcing member. The steel sheet as the reinforcing member is typically smaller than the steel sheet as the main starting material. In an example described in the present embodiment, the steel sheet 51 is the main starting material, and the steel sheet 52 is the reinforcing member. The steel sheet 52 is therefore smaller than the steel sheet 51.

In the example described in the present embodiment, the steel sheet 52 as the reinforcing member is disposed inside the steel sheet 51 as the main starting material. Of the steel sheets 51 and 52, letting $t_{out}$ [mm] denote a sheet thickness of the steel sheet 51 located on an outer side in the bent areas $A_{b1}$ and $A_{b2}$ and $t_{in}$ [mm] denote a sheet thickness of the steel sheet 52 located on an inner side in the bent areas $A_{b1}$ and $A_{b2}$, a ratio of $t_{out}$ to $t_{in}$ is 1.1 or more ($t_{out}/t_{in} \geq 1.1$), and preferably is 1.2 or more ($t_{out}/t_{in} \geq 1.2$). In addition, the ratio of $t_{out}$ to $t_{in}$ is preferably 4.0 or less ($t_{out}/t_{in} \leq 4.0$). The sheet thicknesses $t_{out}$ and $t_{in}$ can be set in the range of 0.6 mm or more to 3.2 mm or less, for example. Note that the sheet thickness $t_{in}$, which is the smaller one, is preferably less than 2.7 mm.

The steel sheets 51 and 52 are laid one on the other and joined together. The steel sheets 51 and 52 are preferably subjected to continuous joining. The continuous joining is a joining method that results in the formation of a linear or a planar joint. The continuous joining includes continuous welding such as laser welding, arc welding, and seam welding and includes continuous depositing such as brazing. The steel sheets 51 and 52 may be subjected to discontinuous joining (welding) by, for example, spot welding.

FIG. 1 and FIG. 2 illustrate an example in which linear joint parts 60 are formed in the steel component 100 as a result of joining the steel sheets 51 and 52 together by the laser welding. In each of the bent areas $A_{b1}$ and $A_{b2}$, one or more joint parts 60 between the steel sheets 51 and 52 are disposed. In the example described in the present embodiment, a plurality of joint parts 60 are disposed in each of the bent areas $A_{b1}$ and $A_{b2}$. The joint parts 60 are each disposed in the ridge portion 31 in the bent area $A_{b1}$ or in the ridge portion 32 in the bent area $A_{b2}$, or at a position that satisfies $d/t_{in}<8.2$ in a vicinity of (outside) one of the ridge portions 31 and 32. When viewed in a cross section of the steel component 100, d [mm] is a distance from the ridge portion 31 or 32 to each of the joint parts 60. In a case where a joint part 60 is disposed in a vicinity of (outside) the ridge portion 31 in the bent area $A_{b1}$, which is one of the bent areas, the distance d between the joint part 60 and the ridge portion 31 is a distance from one of ends of the ridge portion 31 that is the closer to the joint part 60 to a joint center of the joint part 60 when viewed in a cross section of the steel component 100. Likewise, in a case where a joint part 60 is disposed in a vicinity of (outside) the ridge portion 32 in the bent area $A_{b2}$, which is the other of the bent areas, the distance d between the joint part 60 and the ridge portion 32 is a distance from one of ends of the ridge portion 32 that is the closer to the joint part 60 to a joint center of the joint part 60 when viewed in a cross section of the steel component 100.

In a case where a plurality of joint parts 60 are provided in the bent area $A_{b1}$, all of the joint parts 60 may be disposed in the ridge portion 31 or may be disposed in a vicinity of (outside) the ridge portion 31. Alternatively, of the plurality of joint parts 60, some joint parts 60 may be disposed in the ridge portion 31, and the other joint parts 60 may be disposed in a vicinity of the ridge portion 31. In a case where two or more joint parts 60 are provided in a vicinity of the ridge portion 31 in the bent area $A_{b1}$, distances d between the joint parts 60 and the ridge portion 31 may be the same or may be different from one another.

Likewise, in a case where a plurality of joint parts 60 are provided in the bent area $A_{b2}$, all of the joint parts 60 may be disposed in the ridge portion 32 or may be disposed in a vicinity of (outside) the ridge portion 32. Alternatively, of the plurality of joint parts 60, some joint parts 60 may be disposed in the ridge portion 32, and the other joint parts 60 may be disposed in a vicinity of the ridge portion 32. In a case where two or more joint parts 60 are provided in a vicinity of the ridge portion 32 in the bent area $A_{b2}$, distances d between the joint parts 60 and the ridge portion 32 may be the same or may be different from one another. In addition to the joint parts 60 in the bent areas $A_{b1}$ and $A_{b2}$, the steel component 100 may be further provided with a joint part between the steel sheets 51 and 52 at a location in an area other than the bent areas $A_{b1}$ and $A_{b2}$.

In the example described in the present embodiment, the joint parts 60 formed by the laser welding extend in the longitudinal direction of the steel component 100. The joint parts 60 may extend continuously along an overall length of overlap area between the steel sheets 51 and 52 or may be each split into a plurality of subparts in the longitudinal direction. In a case where a joint part 60 is split into subparts in the longitudinal direction, a distance between adjacent subparts of the joint part 60 split into is preferably, for example, 30.0 mm or less and more preferably 20.0 mm or less. In contrast, for example, in a case where the joint parts 60 are formed by spot welding, a spot weld pitch P preferably satisfies $P/t_{in} \leq 40$.

[Method for Producing Steel Component]

Figure 3A:
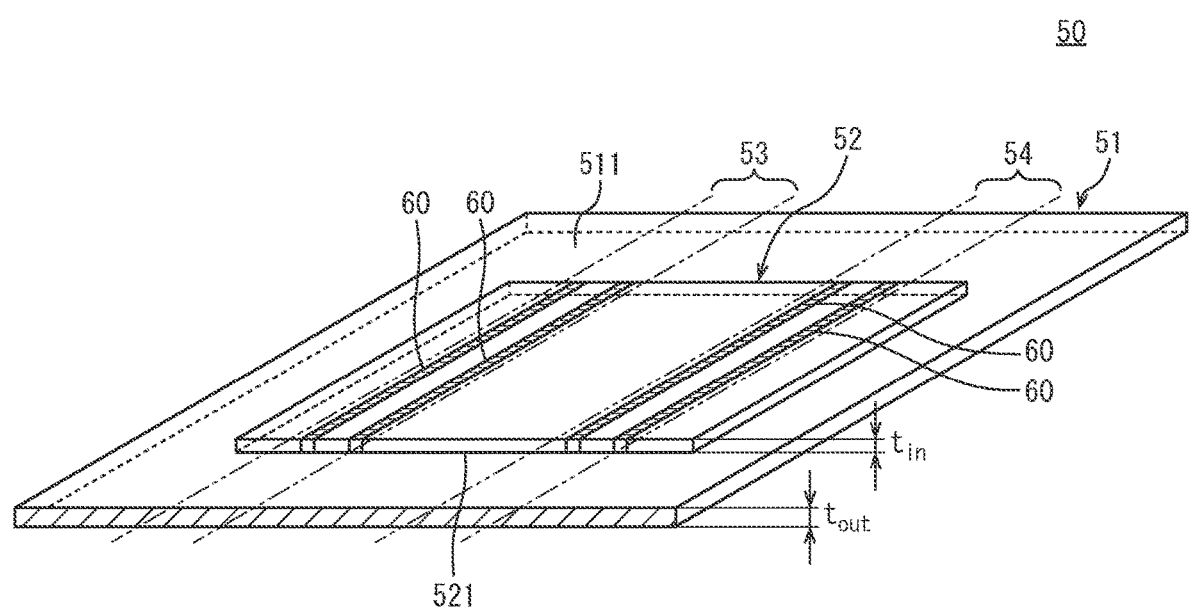
FIG. 3A is a schematic diagram for explaining each step included in a production method for a steel component according to the first embodiment.
Figure 3B:
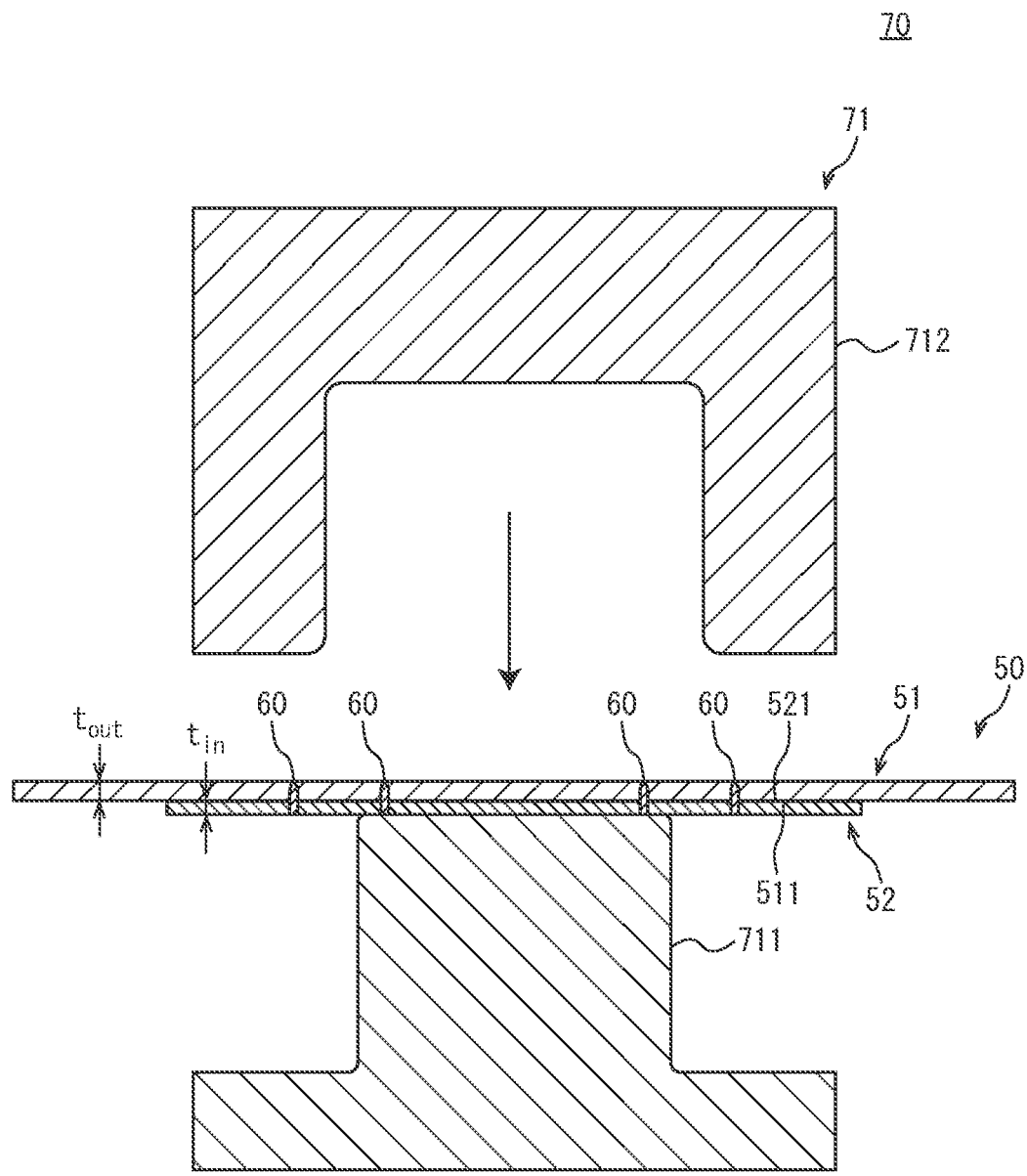
FIG. 3B is another schematic diagram for explaining each step included in the production method for a steel component according to the first embodiment.
Figure 3C:
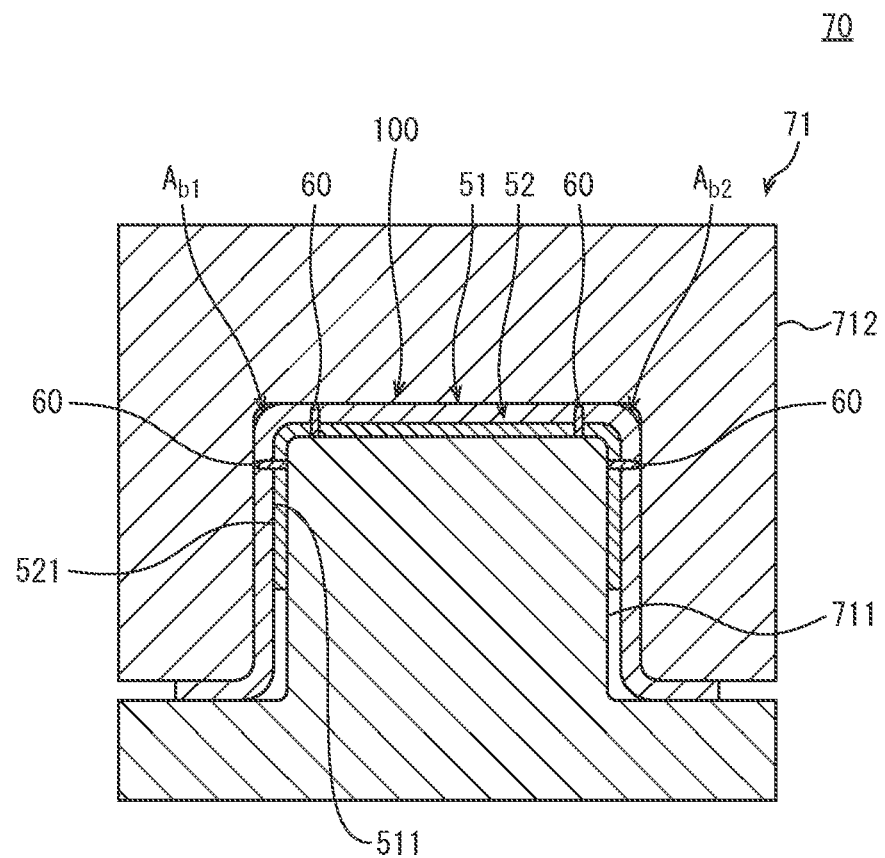
FIG. 3C is still another schematic diagram for explaining each step included in the production method for a steel component according to the first embodiment.

Next, a method for producing the steel component 100 as described above will be described with reference to FIG. 3A to FIG. 3C. FIG. 3A to FIG. 3C are schematic diagrams for explaining each step included in the method for producing the steel component 100. The method for producing the steel component 100 includes a step of preparing a patchwork material being a starting material, a step of heating the patchwork material, a step of forming the patchwork material heated in the step of heating into the steel component 100 by hot stamping using press tooling.

(Preparation Step)

Referring to FIG. 3A, first, a patchwork material 50 to be subjected to the hot stamping is prepared. The patchwork material 50 includes steel sheets 51 and 52. The steel sheets 51 and 52 are laid one on the other and joined together. In the example described in the present embodiment, the steel sheet 52 as a reinforcing member is wholly covered with the steel sheet 51 as a main starting material. As described above, the steel sheets 51 and 52 are preferably subjected to continuous joining. The steel sheets 51 and 52 are joined together by, for example, laser welding. Joint parts 60 between the steel sheet 51 and the steel sheet 52 are provided in at least areas 53 and 54 that are to be formed into bent areas $A_{b1}$ and $A_{b2}$ when the patchwork material 50 is formed into a steel component 100 (FIG. 1 and FIG. 2). Note that joint parts 60 may be further provided in another area on the patchwork material 50.

In the patchwork material 50, the steel sheet 52, which is to be disposed inside bends has a sheet thickness $t_{in}$ that is smaller than a sheet thickness $t_{out}$ of the steel sheet 51, which is to be disposed outside the bends. Specifically, the sheet thickness $t_{out}$ of the steel sheet 51 and the sheet thickness $t_{in}$ of the steel sheet 52 satisfy a relation of $t_{out}/t_{in} \geq 1.1$. The relation between the sheet thickness $t_{out}$ of the steel sheet 51 and the sheet thickness $t_{in}$ of the steel sheet 52 is preferably $t_{out}/t_{in} \geq 1.2$. In addition, the relation between the sheet thickness $t_{out}$ of the steel sheet 51 and the sheet thickness $t_{in}$ of the steel sheet 52 is preferably $t_{out}/t_{in} \leq 4.0$.

At least one of an overlap surface 511 of the steel sheet 51 to the steel sheet 52 and an overlap surface 521 of the steel sheet 52 to the steel sheet 51 includes a zinc-based plating layer. In other words, at least one of the steel sheets 51 and 52 is a zinc-based plated steel sheet. In a case where one of the steel sheets 51 and 52 is a zinc-based plated steel sheet, the other steel sheet may be an aluminum-based plated steel sheet or may be a steel sheet without a plating layer on its layer (what is called bare steel). Alternatively, both steel sheets 51 and 52 may be zinc-based plated steel sheets.

The zinc-based plating layer is, for example, a galvanized layer or a galvannealed layer. The galvanized layer is a plating layer containing zinc (Zn) as its main component. The galvannealed layer is a plating layer containing a zinc alloy as its main component. For example, the galvannealed layer is a Zn—Fe-based plating layer, a Zn—Al-based plating layer, a Zn—Mg-based plating layer, or a Zn—Al—Mg-based plating layer. More specifically, examples of the zinc-based plating layer can include galvanized plating, galvannealed (e.g., Zn-10% Fe) plating, molten Zn-55% Al-1.6% Si plating, molten Zn-11% Al plating, molten Zn-11% Al-3% Mg plating, molten Zn-6% Al-3% Mg plating, molten Zn-11% Al-3% Mg-0.2% Si plating, electrogalvanized plating, and electrogalvanized Zn—Co plating (% means mass %). The zinc-based plating layer may be a vapor deposition plating having the same components of one of these types of plating. A weight per square-meter of the zinc-based plating layer of at least one of the steel sheet 51 and the steel sheet 52 can be determined as appropriate. A base metal steel sheet on which the zinc-based plating layer is to be formed is not limited to a specific base metal steel sheet; the base metal steel sheet can be selected as appropriate in accordance with required properties of a component.

(Heating Step)

Next, the prepared patchwork material 50 is heated to a predetermined temperature. The patchwork material 50 can be heated with, for example, a known heating furnace (not illustrated). The patchwork material 50 is heated to a temperature that is suitable for hot stamping.

In the patchwork material 50 before being heated in the heating step, a melting start temperature of the zinc-based plating layer between the steel sheets 51 and 52 is, for example, 700° C. or less. The patchwork material 50 is heated to at least a temperature that is not less than the melting start temperature of the zinc-based plating layer. The patchwork material 50 is heated in the heating step such that a temperature of the patchwork material 50 becomes not less than the melting start temperature of the zinc-based plating layer when the hot stamping is performed in a forming step, which is the next step.

(Forming Step)

Referring to FIG. 3B and FIG. 3C, the patchwork material 50 heated in the heating step is subjected to pressing with a known press apparatus 70. More specifically, press tooling 71 set in the press apparatus 70 is used to perform the hot stamping on the patchwork material 50 to form the steel component 100. The press tooling 71 includes, for example, a punch 711 and a die 712. As illustrated in FIG. 3B, the patchwork material 50 heated is placed on the punch 711 such that the steel sheet 52 faces the punch 711. By lowering the die 712 in this state, the patchwork material 50 is formed into the steel component 100 by a convex tool surface of the punch 711 and a concave tool surface of the die 712, as illustrated in FIG. 3C. In the formed steel component 100, joint parts 60 of the steel sheets 51 and 52 are disposed in at least the bent areas $A_{b1}$ and $A_{b2}$. The steel component 100 is cooled (quenched) by being brought into contact with the press tooling 71 (the punch 711 and the die 712). This causes martensitic transformation in base metal steel sheets, making the steel sheets 51 and 52 include martensite phases.

In the steel component 100, the melting start temperature of the zinc-based plating layer between the steel sheets 51 and 52 rises by alloying with iron diffusing in the plating layer, to 790° C. or less, for example. The melting start temperature of the zinc-based plating layer after the hot stamping can be determined by extracting the zinc-based plating layer sandwiched between joining areas of the steel sheets 51 and 52 (except the steel sheets being the base metal) and conducting differential thermal analysis on the zinc-based plating layer.

Through the steps described above, the steel component 100 is produced. When an additional step is needed, the steel component 100 undergoes the step to be finished into its final state.

[Effects]

Figure 4:
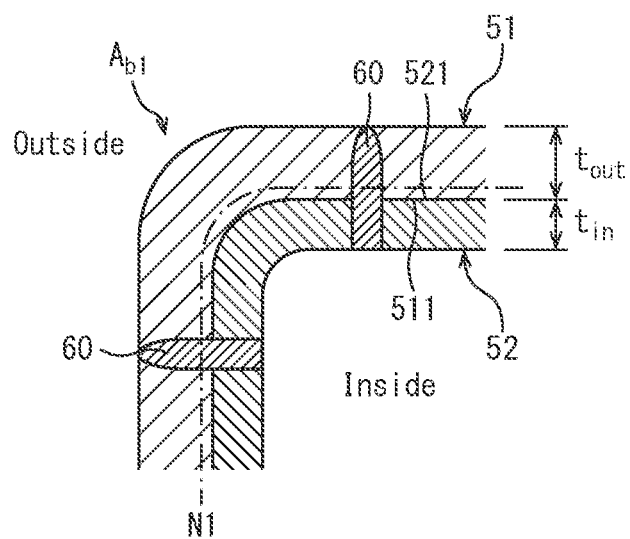
FIG. 4 is a partially enlarged view of the steel component illustrated in FIG. 2.
Figure 5:
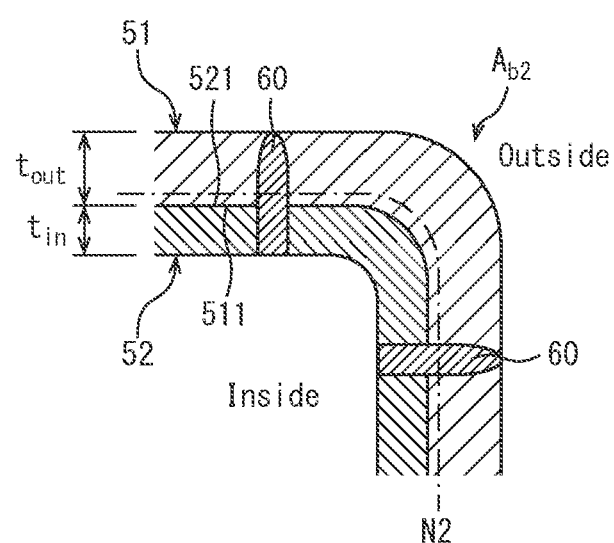
FIG. 5 is another partially enlarged view of the steel component illustrated in FIG. 2.

In the present embodiment, the steel component 100 including the bent areas $A_{b1}$ and $A_{b2}$ is formed by providing the patchwork material 50 including the steel sheets 51 and 52 with bends. By providing the joint parts 60 between the steel sheets 51 and 52 in the bent areas $A_{b1}$ and $A_{b2}$, the steel sheets 51 and 52 are integrated together in the bent areas $A_{b1}$ and $A_{b2}$ As a result, as illustrated in FIG. 4 and FIG. 5, when the bent areas $A_{b1}$ and $A_{b2}$ are formed, neutral axes N1 and N2 are substantially located at a center of an overall sheet thickness of the steel component 100 (a sheet thickness of the steel sheets 51 and 52 in a state where they are laid one on the other).

At the same time, in the bent areas $A_{b1}$ and $A_{b2}$, the sheet thickness $t_{in}$ of the steel sheet 52 located inside is smaller than the sheet thickness $t_{out}$ of the steel sheet 51 located outside. Specifically, the sheet thickness $t_{out}$ of the steel sheet 51 and the sheet thickness $t_{in}$ of the steel sheet 52 satisfy $t_{out}/t_{in} \geq 1.1$. As a result, the overlap surfaces 511 and 521 of the steel sheets 51 and 52 can be located inner than (on a compression side of) the neutral axes N1 and N2 in the bent areas $A_{b1}$ and $A_{b2}$ In other words, the overlap surfaces 511 and 521 of the steel sheets 51 and 52 can be disposed at a location where tensile stress that is one of causes of liquid metal embrittlement (LME) substantially does not act. Consequently, even in a case where at least one of the overlap surfaces 511 and 521 of the steel sheets 51 and 52 includes a galvanized layer, LME can be prevented from occurring in the overlap surfaces 511 and 521 when the patchwork material 50 including the steel sheets 51 and 52 is subjected to the hot stamping.

In the present embodiment, the sheet thickness $t_{out}$ of the steel sheet 51 located outside the bent areas $A_{b1}$ and $A_{b2}$ is preferably 1.2 times or more the sheet thickness $t_{in}$ of the steel sheet 52 located inside the bent areas $A_{b1}$ and $A_{b2}$ ($t_{out}/t_{in} \geq 1.2$). In this case, even if the neutral axes N1 and N2 move slightly inward by bending the patchwork material 50, the overlap surfaces 511 and 521 of the steel sheets 51 and 52 can be disposed inner than (on the compression side of) the neutral axes N1 and N2. Consequently, the occurrence of LME in the overlap surfaces 511 and 521 can be further prevented.

In the present embodiment, in each of the bent areas $A_{b1}$ and $A_{b2}$ of the steel component 100, at least one joint part 60 between the steel sheets 51 and 52 is disposed. In the bent areas Ab1 and Ab2, the joint part 60 is disposed in one of the ridge portions 31 and 32 or in a vicinity of one of the ridge portions 31 and 32. In a case where the joint part 60 is disposed in a vicinity of one of the ridge portions 31 and 32, the distanced from the one of the ridge portions 31 and 32 to the joint part 60 is set such that $d/t_{in} < 8.2$ is satisfied. This enables an effect of integrating the steel sheet 51 and the steel sheet 52 together to be enhanced in the ridge portions 31 and 32, which are substantial bent portions. As a result, the neutral axes N1 and N2 are disposed substantially at the center of the overall sheet thickness of the steel component 100 more easily, and the overlap surfaces 511 and 521 of the steel sheets 51 and 52 satisfying $t_{out}/t_{in} \geq 1.1$ can be disposed inner than (on the compression side of) the neutral axes N1 and N2. Consequently, the occurrence of LME in the overlap surfaces 511 and 521 can be prevented more easily.

In the present embodiment, it is more preferable that the joint parts 60 between the steel sheets 51 and 52 are disposed in one of the ridge portions 31 and 32, or at positions that satisfy $d/t_{in} < 2.3$ in vicinities of one of the ridge portions 31 and 32. This enables the effect of integrating the steel sheet 51 and the steel sheet 52 together to be enhanced in the ridge portions 31 and 32.

In the present embodiment, the steel sheets 51 and 52 are preferably subjected to continuous joining. The continuous joining enables the steel sheets 51 and 52 to be joined together in a linear or planar manner. As a result, as compared with discontinuous joining in which joining is performed in a dot pattern, the effect of integrating the steel sheets 51 and 52 together in the bent areas $A_{b1}$ and $A_{b2}$ can be enhanced.

In the steel component 100 and the method for producing the steel component 100 according to the present embodiment, it is only required to provide a zinc-based plated steel sheet as at least one of the steel sheets 51 and 52; however, both steel sheets 51 and 52 can be provided in forms of zinc-based plated steel sheets. In a case where both steel sheets 51 and 52 included in the patchwork material 50 are zinc-based plated steel sheets, oxide scales can be prevented from being produced when the patchwork material 50 is subjected to the hot stamping to be formed into the steel component 100. As a result, there is no need to perform shotblasting or the like to remove oxide scales from the steel component 100 after the formation. Consequently, a production process for the steel component 100 can be simplified.

In a case where both steel sheets 51 and 52 are zinc-based plated steel sheets, an amount of zinc at a boundary between the steel sheets 51 and 52 that are laid one on the other is increased as compared with a case where one of the steel sheets 51 and 52 is a zinc-based plated steel sheet. It is considered that this makes LME prone to occur from the overlap surfaces 511 and 521 of the steel sheets 51 and 52. However, in the present embodiment, the steel sheets 51 and 52 are integrated together in the bent areas $A_{b1}$ and $A_{b2}$, and additionally, the sheet thickness $t_{in}$ of the steel sheet 52 located inside the bends is smaller than the sheet thickness $t_{out}$ of the steel sheet 51 located outside the bends. This enables the overlap surfaces 511 and 521 of the steel sheets 51 and 52 to be disposed inner than (on the compression side of) the neutral axes N1 and N2 of the bends. Consequently, the occurrence of LME can be prevented even when each of the steel sheets 51 and 52 includes a zinc-based plating layer on its overlap surface facing an opposing steel sheet.

Second Embodiment

Figure 6:
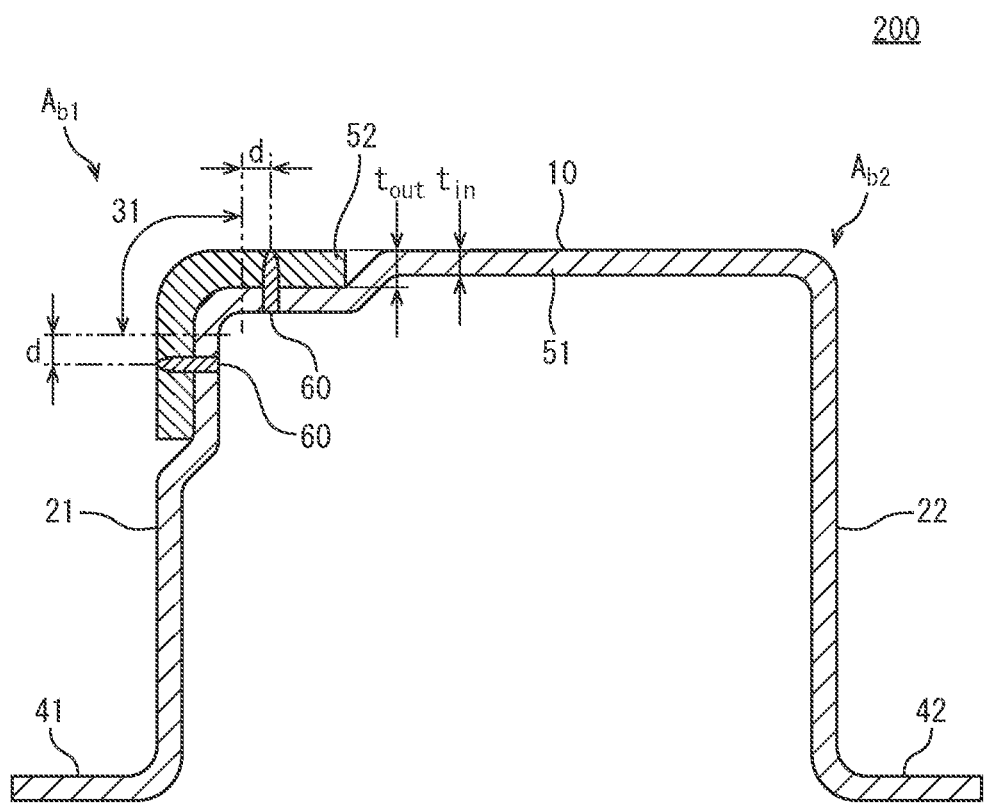
FIG. 6 is a cross-sectional view of a steel component according to a second embodiment.

FIG. 6 is a cross-sectional view of a steel component 200 according to a second embodiment. In the first embodiment, in the steel component 100 having a substantially hat-shaped cross section (FIG. 1 and FIG. 2), the steel sheet 52 being a reinforcing member is disposed inside the steel sheet 51 being a main starting material. In contrast, in the present embodiment, as illustrated in FIG. 6, in the steel component 200 having a substantially hat-shaped cross section, a steel sheet 52 is disposed outside a steel sheet 51. Further, in the steel component 200, while a bent area $A_{b1}$ is reinforced with the steel sheet 52, a bent area $A_{b2}$ is not reinforced with the steel sheet 52. As in the first embodiment, at least one of the steel sheets 51 and 52 is a zinc-based plated steel sheet.

Referring to FIG. 6, the steel sheet 52 is disposed on the steel sheet 51 in the bent area $A_{b1}$ of the steel component 200 and joined to the steel sheet 51. In the present embodiment, the steel sheet 52 as a reinforcing member is disposed outside the bent area $A_{b1}$, and the steel sheet 51 as a main starting material is disposed inside the bent area $A_{b1}$. In this case, the steel sheet 52 has a larger sheet thickness $t_{out}$, and the steel sheet 51 has a smaller sheet thickness $t_{in}$. A ratio of the sheet thickness $t_{out}$ of the steel sheet 52 to the sheet thickness $t_{in}$ of the steel sheet 51 is 1.1 or more ($t_{out}/t_{in} \geq 1.1$) and more preferably 1.2 or more ($t_{out}/t_{in} \geq 1.2$). In addition, the ratio of $t_{out}$ to $t_{in}$ is preferably 4.0 or less ($t_{out}/t_{in} \leq 4.0$).

As in the first embodiment, the sheet thickness $t_{in}$ of the steel sheet 51 and the sheet thickness $t_{out}$ of the steel sheet 52 can be set in the range of 0.6 mm or more to 3.2 mm or less, for example. Note that the sheet thickness $t_{in}$, which is the smaller, is preferably less than 2.7 mm. A portion of the steel sheet 51 at which the steel sheet 52 is laid on the steel sheet 51 is recessed inward by the sheet thickness $t_{out}$ of the steel sheet 52. This makes a surface of the steel sheet 52 substantially flush with surfaces of the other portions of the steel sheet 51.

Figure 7A:
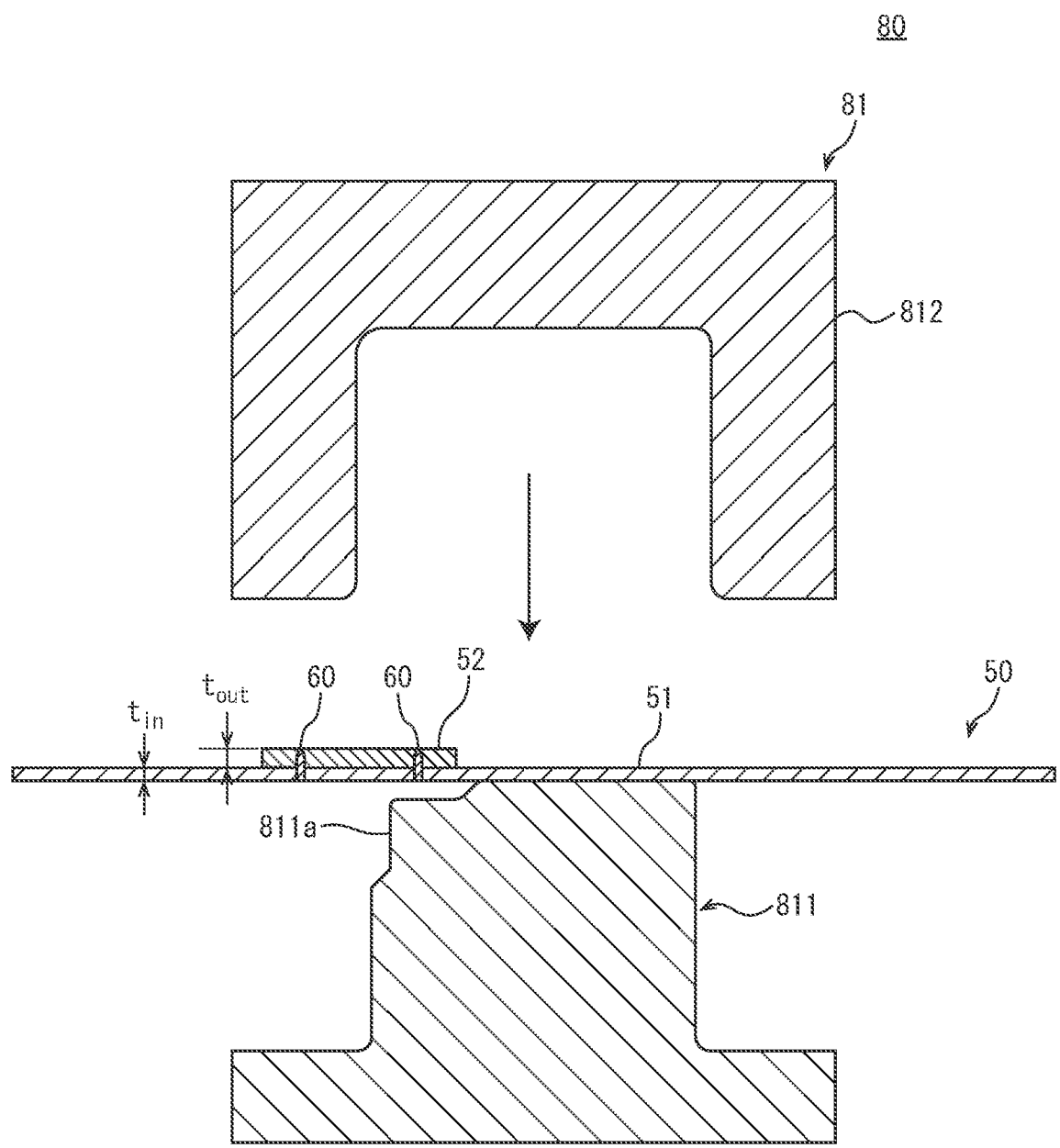
FIG. 7A is a schematic diagram for explaining each step included in a production method for a steel component according to the second embodiment.
Figure 7B:
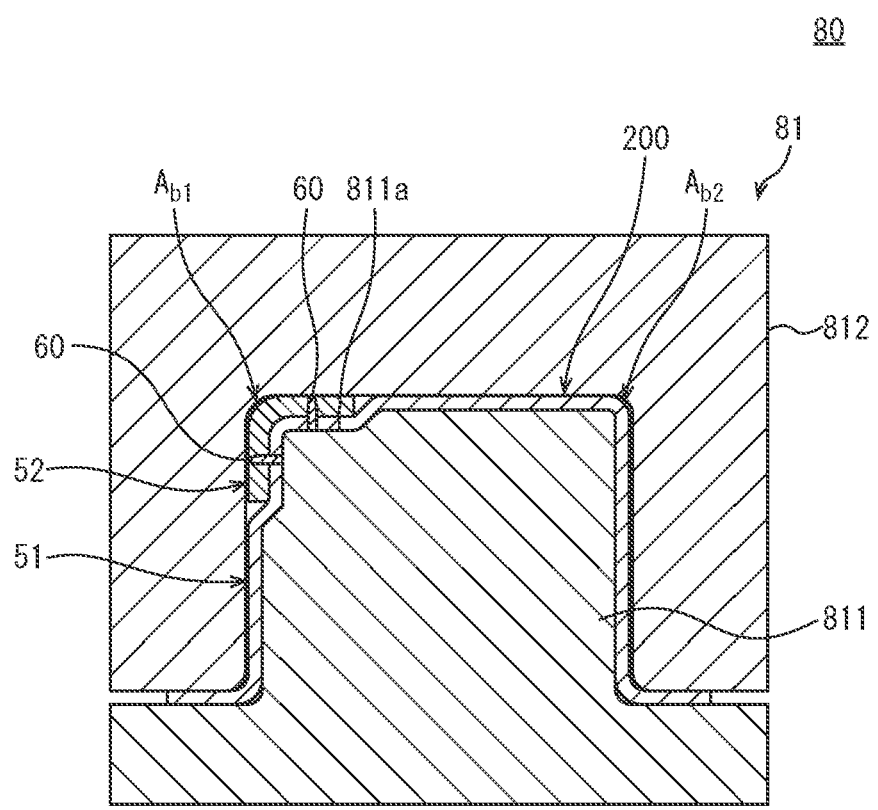
FIG. 7B is another schematic diagram for explaining each step included in the production method for a steel component according to the second embodiment.

In producing the steel component 200, a patchwork material that is a starting material of the steel component 200 is prepared and heated as in the first embodiment. Thereafter, for example, the patchwork material at a temperature that is not less than the melting start temperature of a zinc-based plating layer is subjected to hot stamping to be formed into the steel component 200. FIG. 7A and FIG. 7B are schematic diagrams for explaining a forming step for the steel component 200.

Referring to FIG. 7A, after a heating step, a patchwork material 50 including the steel sheets 51 and 52 is conveyed to a press apparatus 80 by, for example, a roller conveyor. At this time, by arranging the steel sheet 52 being a reinforcing member on an upper side, the patchwork material 50 can be conveyed without being inclined. The patchwork material 50 is carried into the press apparatus 80 in which press tooling 81 is set. The press tooling 81 includes a punch 811 and a die 812.

The patchwork material 50 is placed on the punch 811 with the steel sheet 52 facing upward. On a tool surface of the punch 811, a recessed portion 811a is formed. The recessed portion 811a is provided at a location on the tool surface of the punch 811 corresponding to the steel sheet 52. When compared with the other portions of the tool surface of the punch 811, the recessed portion 811a is recessed substantially by the sheet thickness $t_{out}$ of the steel sheet 52.

Referring to FIG. 7B, by lowering the die 812, the patchwork material 50 is formed into the steel component 200 by the tool surface of the punch 811 and a tool surface of the die 812. At this time, a portion of the steel sheet 51 where the steel sheet 52 is laid on the steel sheet 51 falls into the recessed portion 811a of the tool surface of the punch 811 to be recessed by the sheet thickness $t_{out}$ of the steel sheet 52. As a result, in the formed steel component 200, a surface of the steel sheet 52 is flush with surfaces of portions of the steel sheet 51 where the steel sheet 52 is not laid on the steel sheet 51. The steel component 200 is cooled (quenched) by being brought into contact with the press tooling 81 (the punch 811 and the die 812). This causes martensitic transformation in base metal steel sheets, making the steel sheets 51 and 52 include martensite phases.

Figure 8:
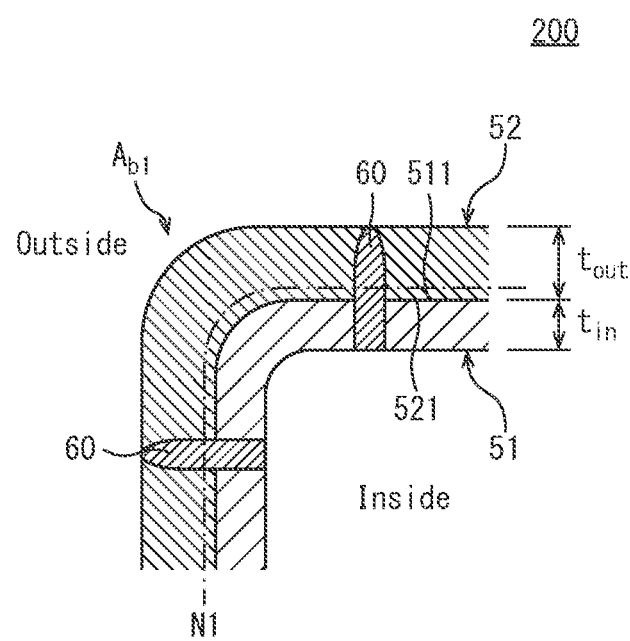
FIG. 8 is a partially enlarged view of the steel component illustrated in FIG. 6.

Also, in the present embodiment, joint parts 60 between the steel sheets 51 and 52 are disposed at least in the bent area $A_{b1}$ as in the first embodiment. Further, the sheet thickness $t_{in}$ of the steel sheet 51 located inside the bent area $A_{b1}$ is smaller than the sheet thickness $t_{out}$ of the steel sheet 52 located outside the bent area $A_{b1}$. Specifically, the sheet thickness $t_{in}$ of the steel sheet 51 and the sheet thickness $t_{out}$ of the steel sheet 52 satisfy $t_{out}/t_{in} \geq 1.1$. As a result, overlap surfaces 511 and 521 of the steel sheets 51 and 52 can be located inner than (on a compression side of) the neutral axis N1 in the bent area $A_{b1}$ as illustrated in FIG. 8. Consequently, even in a case where at least one of the overlap surfaces 511 and 521 of the steel sheets 51 and 52 includes a galvanized layer, LME can be prevented from occurring in the overlap surfaces 511 and 521 when the patchwork material 50 including the steel sheets 51 and 52 is subjected to the hot stamping.

Also, in the present embodiment, the joint parts 60 between the steel sheets 51 and 52 are disposed in a ridge portion 31 or in a vicinity of the ridge portion 31 in the bent area $A_{b1}$ as in the first embodiment (FIG. 6). In a case where the joint parts 60 are disposed in a vicinity of the ridge portion 31, distances d from the ridge portion 31 to the joint parts 60 satisfy $d/t_{in} < 8.2$ and more preferably $d/t_{in} < 2.3$. As a result, an excellent effect of integrating the steel sheet 51 and the steel sheet 52 together can be provided in the ridge portion 31 of the steel component 200.

Embodiments according to the present disclosure are described above, but the present disclosure is not limited to the above embodiments, and various modifications can be made without departing the scope of the present disclosure.

Figure 9:
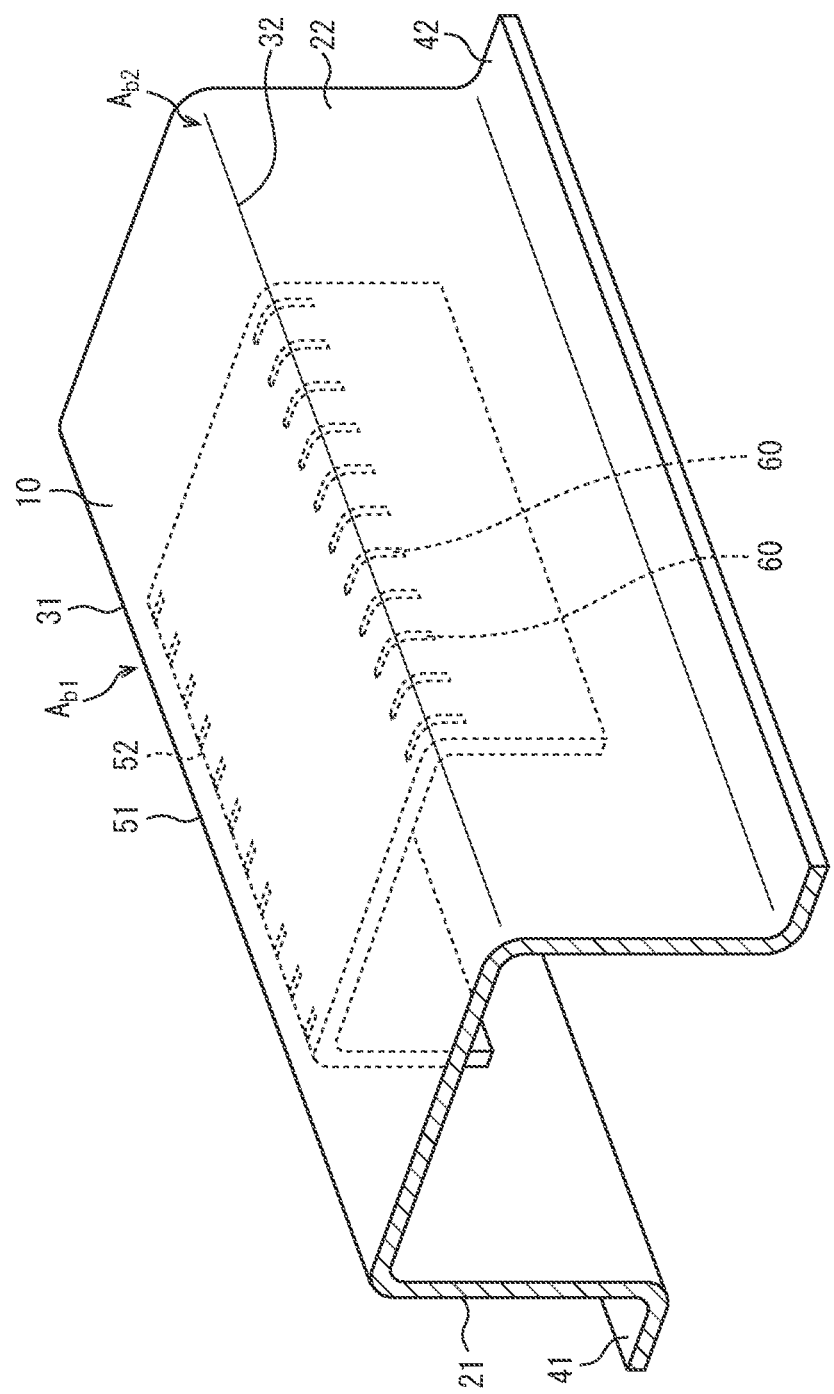
FIG. 9 is a perspective view illustrating a part of a steel component according to a modification of the first embodiment.

For example, the embodiments are described about an example in which the linear joint parts 60 extend along the longitudinal directions of the steel components 100 and 200. However, the configuration of the joint parts 60 is not limited to this example. For example, as illustrated in FIG. 9, joint parts 60 may extend in a width direction of a steel component in such a manner as to pass through a bent area $A_{b1}$ or $A_{b2}$. In this case, it is preferable that, in each of the bent areas $A_{b1}$ and $A_{b2}$, a plurality of joint parts 60 are arranged in a longitudinal direction of the steel component at a distance of, for example, 60.0 mm or less. Note that the joint parts 60 are not necessarily linear and may be planar or in a dot pattern.

In the embodiments, the patchwork material 50 includes one steel sheet 52 as a reinforcing member. However, the patchwork material 50 may include two or more steel sheets 52 as reinforcing members.

In the steel component 100 according to the first embodiment, both bent areas $A_{b1}$ and $A_{b2}$ are reinforced with one steel sheet 52. However, in the steel component 100, the bent areas $A_{b1}$ and $A_{b2}$ can be reinforced with respective, separate steel sheets 52. Alternatively, in the steel component 100, only one of the bent areas $A_{b1}$ and $A_{b2}$ may be reinforced with a steel sheet 52.

In the steel component 200 according to the second embodiment, only one of the bent areas, the bent area $A_{b1}$, is reinforced with the steel sheet 52. However, in the steel component 200, both bent areas $A_{b1}$ and $A_{b2}$ can be reinforced with a steel sheet 52 or steel sheets 52. In this case, as in the first embodiment, the bent areas $A_{b1}$ and $A_{b2}$ may be reinforced with a common steel sheet 52, or the bent areas $A_{b1}$ and $A_{b2}$ may be reinforced with respective, separate steel sheets 52.

In the steel component 100 according to the first embodiment, the steel sheet 52 being a reinforcing member is disposed inside the steel sheet 51 being a main starting material. In contrast, in the steel component 200 according to the second embodiment, the steel sheet 52 being a reinforcing member is disposed outside the steel sheet 51 being a main starting material. A steel component can be configured as a combination of the first embodiment and the second embodiment. In other words, it is possible to dispose a steel sheet 52 as a reinforcing member inside a steel sheet 51 in one of bent areas $A_{b1}$ and $A_{b2}$ and dispose a steel sheet 52 as a reinforcing member outside the steel sheet 51 in the other of the bent areas $A_{b1}$ and $A_{b2}$. In this case, a sheet thickness of the steel sheet 51 is set such that the sheet thickness is larger than a sheet thickness of the steel sheet 52 disposed inside the steel sheet 51 and smaller than a sheet thickness of the steel sheet 52 disposed outside the steel sheet 51.

In the embodiment, the steel components 100 and 200 each have a substantially hat-shaped cross section. However, the shape of the steel components is not limited to the hat shape. The steel components may have any shape with at least one bent area.

EXAMPLES

The present disclosure will be described below more in detail with Examples. Note that the present disclosure is not limited to the following Examples.

First Example

To investigate a preferable distance from the ridge portions 31 and 32 to the joint parts 60, a numerical analysis (plane strain analysis) that simulates a V-bend test was conducted on a plurality of types of patchwork materials. The numerical analysis was conducted in an implicit static analysis using the general-purpose structural analysis software (LS-Dyna R9.1.0, manufactured by Livemore Software Technology Corporation (LSTC)). The V-bend test here refers to a test conducted in the V-block bend method, which is one of the metallic material bend test methods defined in JIS Z2248: 2006. Conditions for bending were set such that a distance between supports for a patchwork material (a trough width of a V block): 40.0 mm, a bending angle: 100°, a bending radius (inside): 3.0 mm, and a length of a bent portion (arc length): 4.2 mm. For the analysis, hot stamping was assumed, and material property data obtained by heating a steel sheet for hot stamping that had a tensile strength of a 1500 MPa class after quenching to about 900° C. was used.

In the analysis, a maximum principal strain in a steel sheet on an inner side in the bend at its portion on an overlap surface side facing an opposing steel sheet (an outer side in the bend) was evaluated while a distance d [mm] from an edge of the bent portion (ridge portion) to a joint part between steel sheets was changed. Results of the evaluation are shown in Table 1 and FIG. 10.

TABLE 1

| No. | Sheet thickness of steel sheet t [mm] on inner side in bend | Sheet thickness of steel sheet t [mm] on outer side in bend | Distance d [mm] from bent portion to joint part | d/t | Maximum principal strain | Remarks |
|---|---|---|---|---|---|---|
| 1 | 3.2 | — | — | — | 0.044 | Comparative example |
| 2 | 1.6 | 1.6 | 0.0 | 0.00 | 0.046 | |
| 3 | 1.6 | 1.6 | 1.0 | 0.63 | 0.046 | |
| 4 | 1.6 | 1.6 | 3.6 | 2.25 | 0.048 | |
| 5 | 1.6 | 1.6 | 4.0 | 2.50 | 0.060 | |
| 6 | 1.6 | 1.6 | 7.0 | 4.38 | 0.061 | |
| 7 | 1.6 | 1.6 | 10.0 | 6.25 | 0.065 | |
| 8 | 1.6 | 1.6 | 13.0 | 8.13 | 0.070 | |
| 9 | 1.6 | 1.6 | 14.0 | 8.75 | 0.078 | |
| 10 | 1.6 | 1.6 | 15.0 | 9.38 | 0.080 | |
| 11 | 1.6 | 1.6 | 20.0 | 12.50 | 0.086 | |
| 12 | 1.6 | 1.6 | 25.0 | 15.63 | 0.090 | |
| 13 | 1.6 | 1.6 | 30.0 | 18.75 | 0.092 | |

In Table 1, Nos. 2 to 13 show results of the evaluation on patchwork materials that were formed by joining two steel sheets each having a sheet thickness of 1.6 mm together by welding. No. 1 is a comparative example of Nos. 2 to 13, which shows a maximum principal strain that was produced when one steel sheet having a sheet thickness of 3.2 mm was subjected to bending work, at a center portion of the steel sheet in a sheet-thickness direction.

Figure 10:
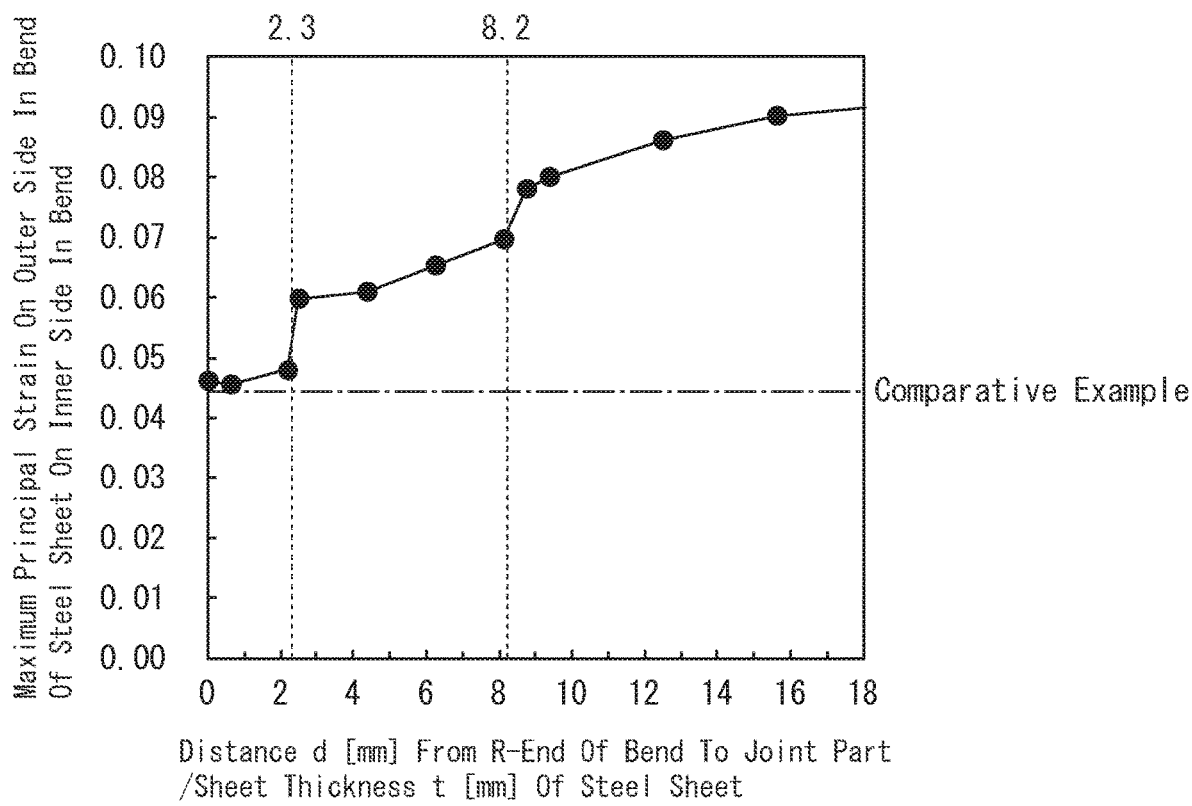
FIG. 10 is a graph showing results of evaluation in a V-bend test conducted as a first Example.

As shown in Table 1 and illustrated in FIG. 10, in a case where one steel sheet having a sheet thickness of 3.2 mm was bent (No. 1), the maximum principal strain that was produced at the central portion of the steel sheet in the sheet-thickness direction was very slight. In a case where a patchwork material formed of two steel sheets was bent, a maximum principal strain in a steel sheet on an inner side in the bend at its portion on an overlap surface side (an outer side in the bend) is small as long as a distance d from an edge of a bent portion (ridge portion) to a joint part is short. However, when d/t becomes 8.2 or more (Nos. 9 to 13), the maximum principal strain significantly increases. In this case, the effect of integrating the steel sheets together is small, and when the patchwork material is bent, a neutral axis is present substantially at a center of a sheet thickness of each steel sheet. Therefore, in a case where d/t≥8.2, presence of liquid zinc between the steel sheets is prone to cause liquid metal embrittlement (LME) to occur from an overlap surface side (an outer side of the bend) of the steel sheet on the inner side in the bend.

From the results, in a case where a joint part 60 is not in the bent portions (ridge portions) 31 and 32 in the steel components 100 and 200 described in the embodiments, a distance d [mm] from the ridge portion 31 or 32 to the joint part 60 is preferably set such that d/t<8.2 is satisfied. In the present Example, the patchwork materials each being formed of steel sheets having the same sheet thickness t were used; however, in the embodiments, the sheet thickness $t_{in}$ of the steel sheet located on an inner side in the bent areas $A_{b1}$ and $A_{b2}$ is different from the sheet thickness $t_{out}$ located on an outer side. In this case, the smaller sheet thickness $t_{in}$ is used as the sheet thickness t for determining the distance d from the ridge portion 31 or 32 to a joint part 60.

Further, as shown in Table 1 and illustrated in FIG. 10, when d/t is less than 2.3 (No. 3 and No. 4), a maximum principal strain in a steel sheet on an inner side in the bend at its portion on an overlap surface side (an outer side in the bend) increased little from the case where one steel sheet having a sheet thickness of 3.2 mm was bent (No. 1) and a case where a joint part between steel sheets is in a ridge portion (No. 2, d=0.0 mm). Consequently, in a case where d/t<2.3, the effect of integrating steel sheets together can be further enhanced, which facilitates preventing the liquid metal embrittlement (LME) from occurring from an overlap surface side (an outer side in the bend) of a steel sheet on an inner side in the bend.

Second Example

To check the movement of a neutral axis when a bend is given to a steel sheet, a numerical analysis (plane strain analysis) that simulated a V-bend test as in the first Example was conducted on a steel sheet having a sheet thickness: 1.2 mm while a bending radius (inner side) was changed. The numerical analysis was conducted in an implicit static analysis using the structural analysis software as in the first Example. In the analysis, stress values in a bending arc direction in elements were collected along a sheet-thickness direction of the steel sheet, and an element where the stress value was zero or the closest to zero among the elements was determined to be on a neutral axis.

Figure 11:
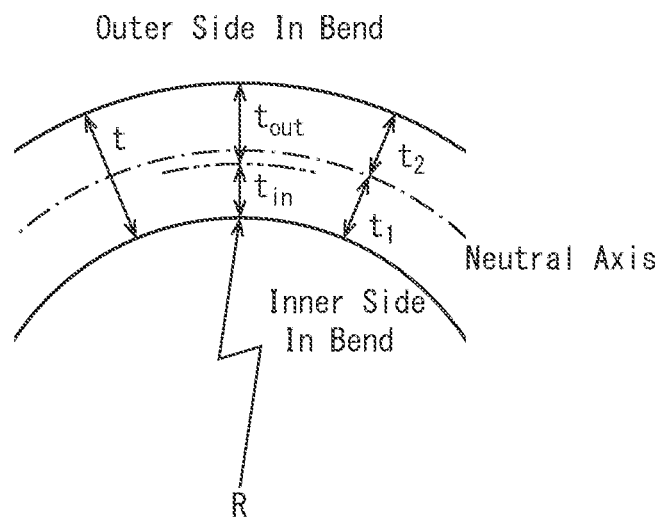
FIG. 11 is a schematic diagram for explaining a V-bend test conducted as a second Example.
Figure 12:
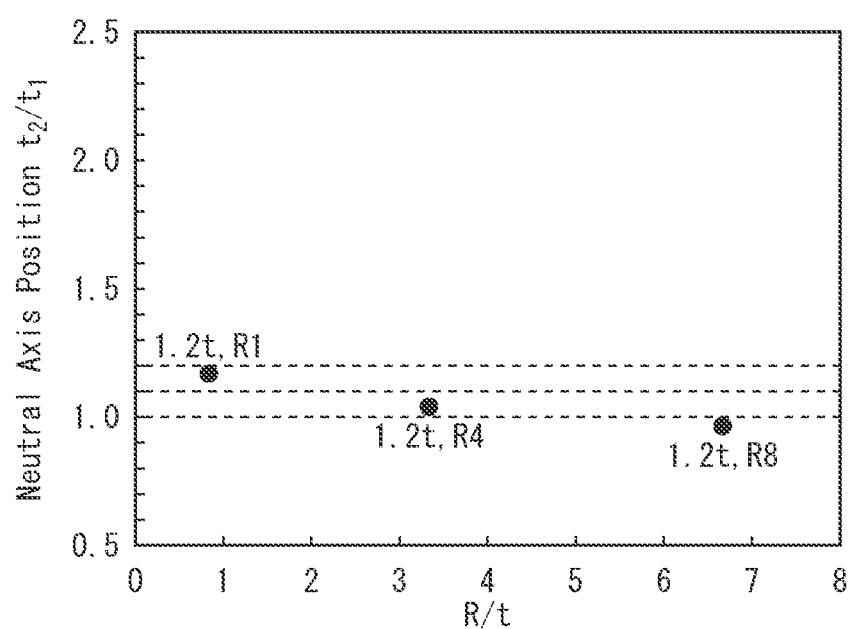
FIG. 12 is a graph showing results of evaluation in the V-bend test conducted as the second Example.

FIG. 11 is a schematic diagram for explaining dimensions of portions of a steel sheet that was subjected to the V-bend test. In FIG. 11, an overall sheet thickness of the steel sheet is denoted by t, a bending radius is denoted by R, and sheet thicknesses of the steel sheet on an inner side and an outer side in the bend from the neutral axis are denoted by $t_1$ and $t_2$, respectively. FIG. 12 is a graph in which the ordinate is $t_2/t_1$, and the abscissa is R/t. Hereinafter, $t_2/t_1$ will be referred to as a neutral axis position. In a case where a sheet thickness ratio $t_{out}/t_{in}$ of each patchwork material described in the embodiments is larger than the neutral axis position $t_2/t_1$, when the patchwork material is bent, a boundary between its steel sheets is located inner than (on a compression side of) the neutral axis, and thus the occurrence of LME between the steel sheets can be prevented.

As illustrated in FIG. 12, when the sheet thickness t=1.2 mm, and the bending radius R=8.0 mm (R/t=6.67), the neutral axis position $t_2/t_1$ was a little less than 1.0. Therefore, it may be considered that, by making a sheet thickness ratio $t_{out}/t_{in}$ of a patchwork material more than 1.0, the occurrence of LME between its steel sheets can be prevented in forming a steel component from the patchwork material.

However, when the sheet thickness t=1.2 mm, and the bending radius R=4.0 mm (R/t=3.33), the neutral axis slightly moves to an inner side in the bend, and the neutral axis position $t_2/t_1$ was 1.04. In this case, if the sheet thickness ratio $t_{out}/t_{in}$ of the patchwork material is close to 1.0, some tensile stress may be produced between a boundary between the steel sheets or at a portion in a vicinity of the boundary, causing LME. Consequently, to avoid the occurrence of LME easily, it is preferable to set the sheet thickness ratio $t_{out}/t_{in}$ to 1.1 or more.

In a case where the bending radius R is significantly small, it is considered that an amount of the movement of the neutral axis increases, and the neutral axis position $t_2/t_1$ is further increased. In this case, it is preferable to further increase the sheet thickness ratio $t_{out}/t_{in}$ of the patchwork material. For example, in a case where the sheet thickness t=1.2 mm, the bending radius R=1.0 mm, and a magnitude of the bending radius R with respect to the sheet thickness t is minimized within a practically conceivable range (R/t=0.83), the neutral axis position $t_2/t_1$ is 1.17. Consequently, to avoid the occurrence of LME more easily, it is preferable to set the sheet thickness ratio $t_{out}/t_{in}$ to 1.2 or more. Note that the sheet thickness ratio $t_{out}/t_{in}$ is preferably 4.0 or less from the viewpoint of ensuring an anti-crushing performance of a patchwork material and a formed component.

Third Example

An experiment in which patchwork materials made of various types of plated steel sheets were subjected to hot stamping to be formed into steel components was conducted, and occurrence of liquid metal embrittlement (LME) was visually checked. The patchwork materials were each heated for 4 minutes in a heating furnace at a preset temperature of 900° C. and then subjected to the hot stamping using press tooling. In the hot stamping, a temperature of the patchwork materials was about 760° C. The plated steel sheets used in the experiment are shown in Table 2.

TABLE 2

| Plated steel sheet | Plating type | Fusing point of plating layer | Sheet thickness | | $t_{out}/t_{in}$ | Evaluation |
| | | | $t_{in}$ [mm] on inner side in bend | $t_{out}$ [mm] on outer side in bend | | |
| --- | --- | --- | --- | --- | --- | --- |
| A | Zn-10% wt Fe | 670° C. | 1.0 | 1.2 | 1.2 | Excellent |
| A | Zn-10% wt Fe | 670° C. | 1.0 | 1.1 | 1.1 | Good |
| A | Zn-10% wt Fe | 670° C. | 1.0 | 1.0 | 1.0 | Bad |
| B | Zn-10% wt Al | 660° C. | 1.0 | 1.2 | 1.2 | Excellent |
| B | Zn-10% wt Al | 660° C. | 1.0 | 1.1 | 1.1 | Good |
| B | Zn-10% wt Al | 660° C. | 1.0 | 1.0 | 1.0 | Bad |
| C | Zn-10% wt Mg | 650° C. | 1.0 | 1.2 | 1.2 | Excellent |
| C | Zn-10% wt Mg | 650° C. | 1.0 | 1.1 | 1.1 | Good |
| C | Zn-10% wt Mg | 650° C. | 1.0 | 1.0 | 1.0 | Bad |
| D | Zn-10 wt % Ni | 808° C. | 1.0 | 1.2 | 1.2 | Excellent |
| D | Zn-10 wt % Ni | 808° C. | 1.0 | 1.1 | 1.1 | Excellent |
| D | Zn-10 wt % Ni | 808° C. | 1.0 | 1.0 | 1.0 | Good |

Referring to Table 2, in the experiment, a sheet thickness ratio $t_{out}/t_{in}$ of a patchwork material was changed to 1.2, 1.1, and 1.0 for each of the plated steel sheets (plating types), and an effect of preventing LME was evaluated for each of combinations of the plating types and the sheet thickness ratios. In the hot stamping, a bending radius R of each patchwork material was set to 8.0 mm. Thus, R/t in each patchwork material was about 3.6 to 4.0 ($t=t_{in}+t_{out}$). In every patchwork material, a joint part between its steel sheets was formed in an area to be a bent area after the hot stamping. For all the patchwork materials, the position of the joint part between the steel sheets was the same. The other conditions (dimensions, material quality, etc.) were also common to all the patchwork materials.

Fusing point of plating layer shown in Table 2 indicates a fusing point of a zinc-based plating layer in a state before the heating (melting start temperature). In the column of Evaluation in Table 2, "Excellent" indicates that LME did not occur or that the number of occurrences of LME was significantly small. In the column of Evaluation, "Good" indicates that the number of occurrences of LME was small. In the column of Evaluation, "Bad" indicates that the number of occurrences of LME was large.

As shown in Table 2, when a patchwork material made of a steel sheet D, in which a fusing point of a plating layer was more than 700° C., was subjected to the hot stamping, the number of occurrences of LME between the steel sheets was small although a sheet thickness ratio $t_{out}/t_{in}$ of the patchwork material was 1.0. This resulted from a relatively small amount of liquid zinc present between two steel sheets D laid one on the other in the hot stamping because the fusing point of the plating layer of the steel sheets D was higher than a temperature of the patchwork material in the hot stamping. Note that the steel sheet D in which the fusing point of the plating layer was more than 700° C. still demonstrated a tendency of reducing the occurrences of LME between the steel sheets when the sheet thickness ratio $t_{out}/t_{in}$ was set to 1.1 or more.

In contrast, when a patchwork material made of any one of steel sheets A, B, and C, in which fusing points of a plating layer were 700° C. or less, was subjected to the hot stamping, the number of occurrences of LME between the steel sheets was large when a sheet thickness ratio $t_{out}/t_{in}$ of the patchwork material was 1.0. This is because, in a case of the steel sheets A, B, and C, in which the fusing points of a plating layer were lower than a temperature of the patchwork material in the hot stamping, a relatively large amount of liquid zinc was present between two steel sheets laid one on the other in the hot stamping. However, when a sheet thickness ratio $t_{out}/t_{in}$ of the patchwork material was set to 1.1, the occurrences of LME between the steel sheets were clearly reduced even when the hot stamping was performed on the patchwork material made of any one of the steel sheets A, B, and C. When the sheet thickness ratio $t_{out}/t_{in}$ of the patchwork material was set to 1.2, the occurrences of LME between the steel sheets were further reduced.

It is confirmed by the experiment that, in a case where a zinc-based plating layer between steel sheets has a fusing point of 700° C. or less in a state before heating (a starting material state), setting $t_{out}/t_{in} \geq 1.1$ offered a particularly prominent effect of preventing the occurrence of LME. In other words, even when a fusing point of a zinc-based plating layer is 700° C. or less, and a relatively large amount of liquid zinc, which is one of causes of LME, is present between steel sheets, the occurrence of LME can be effectively prevented by satisfying $t_{out}/t_{in} \geq 1.1$.

REFERENCE SIGNS LIST 100, 200: steel component
31, 32: ridge portion
50: patchwork material
51, 52: steel sheet
511, 521: overlap surface
60: joint part
$A_{b1}$, $A_{b2}$: bent area
71, 81: press tooling

The invention claimed is:
1. A production method for a steel component including a bent area, the method comprising:
  a step of preparing a patchwork material including a first steel sheet and a second steel sheet that are laid one on another, at least one of an overlap surface of the first steel sheet to the second steel sheet and an overlap surface of the second steel sheet to the first steel sheet including a zinc-based plating layer, the first steel sheet and the second steel sheet being continuously joined;
  a step of heating the patchwork material; and
  a step of performing hot stamping using press tooling on the patchwork material heated in the step of heating to form the steel component in which a joint part between the first steel sheet and the second steel sheet is disposed in the bent area, wherein
  when $t_{out}$ denotes a sheet thickness of a steel sheet located on an outer side in the bent area out of the first steel sheet and the second steel sheet, and $t_{in}$ denotes a sheet thickness of a steel sheet located on an inner side in the bent area out of the first steel sheet and the second steel sheet, $t_{out}/t_{in} \geq 1.1$ is satisfied, the joint part is disposed in a ridge portion in the bent area or at a position in a vicinity of the ridge portion, the position satisfying $d/t_{in} < 2.3$, where d denotes a distance from the ridge portion to the joint part in a cross-sectional view of the steel component, the ridge portion being a bent portion formed between a top wall and a side wall in the steel component and substantially forming an arc shape in a cross-sectional view of the steel component, and in the patchwork material before being heated in the step of heating, the melting start temperature of the zinc-based plating layer is 700° C. or less.

2. The production method according to claim 1, wherein in the step of heating, the patchwork material is heated to a temperature that is more than or equal to the melting start temperature of the zinc-based plating layer.

3. The production method according to claim 1, wherein $t_{out}/t_{in} \geq 1.2$ is satisfied.

4. The production method according to claim 1, wherein the overlap surface of the first steel sheet to the second steel sheet and the overlap surface of the second steel sheet to the first steel sheet each have a zinc-based plating layer.

* * * * *